Dec. 27, 1966   N. D. HAUGEN   3,294,472
REMOTE CONTROL VISUAL ACUITY PROJECTION APPARATUS
Filed Oct. 29, 1962   2 Sheets-Sheet 2
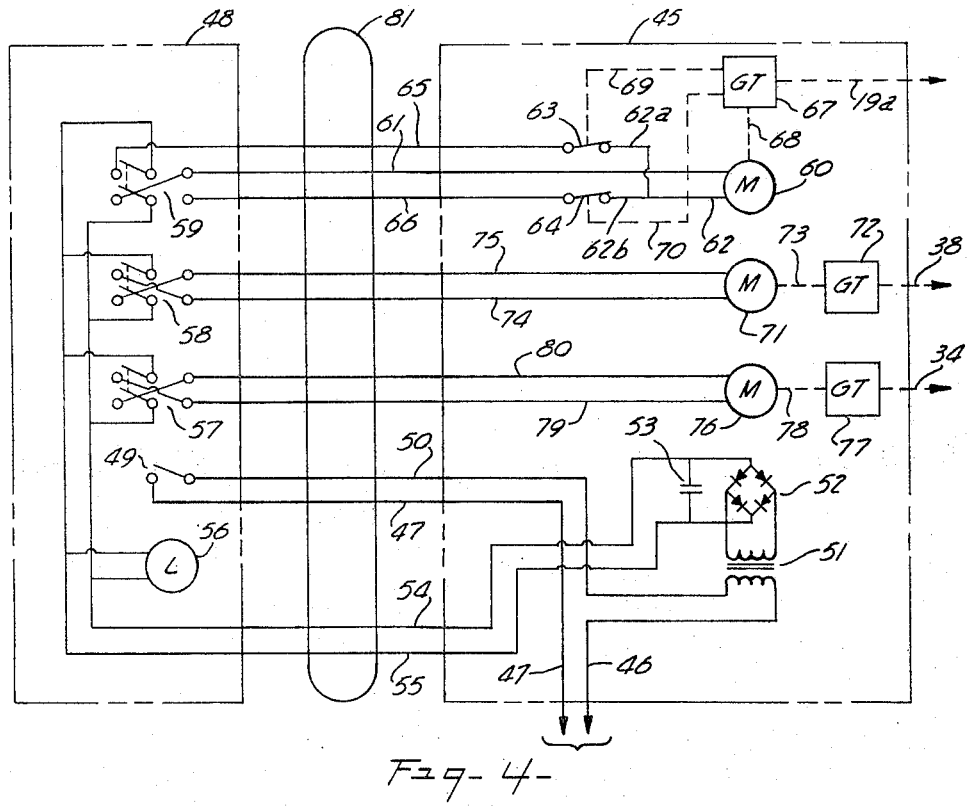
Fig-4-
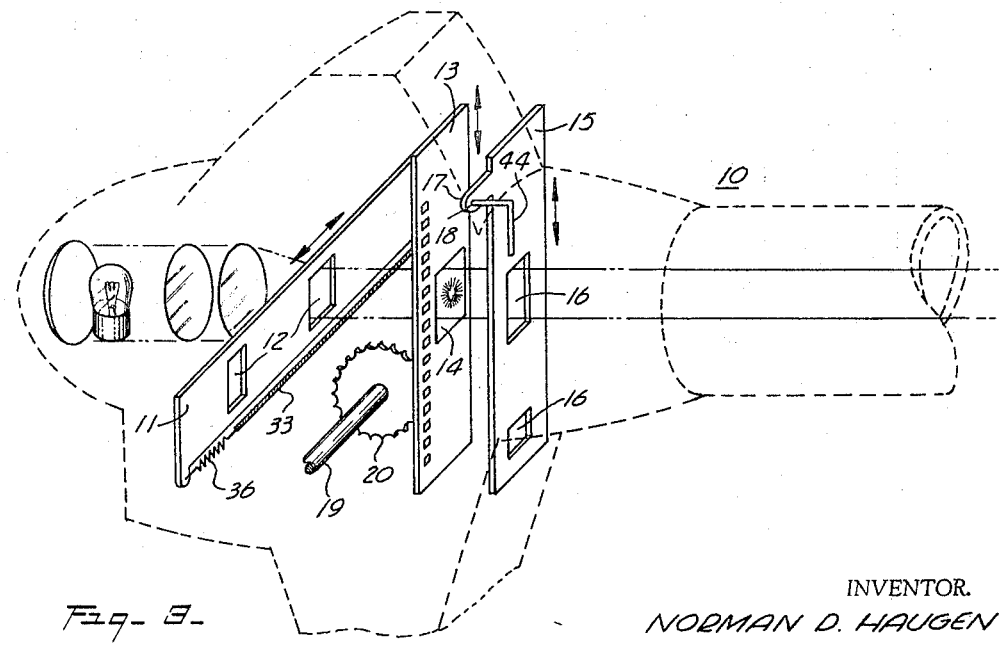
Fig-3-
INVENTOR.
NORMAN D. HAUGEN
BY
Schroeder & Siegfried
ATTORNEYS United States Patent Office 3,294,472
Patented Dec. 27, 1966

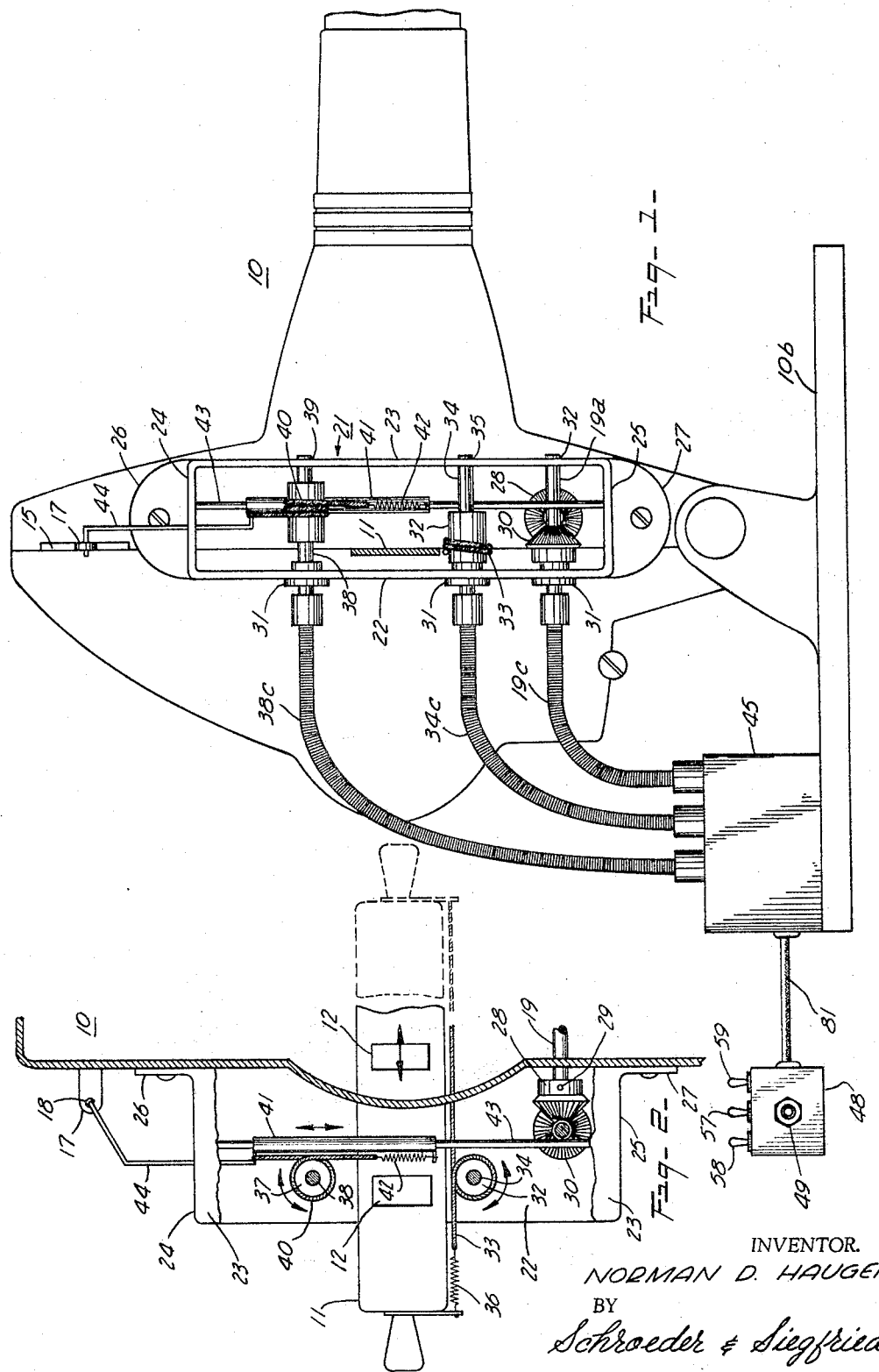

3,294,472
REMOTE CONTROL VISUAL ACUITY
PROJECTION APPARATUS
Norman D. Haugen, Minneapolis, Minn., assignor to The Benson Optical Company, Minneapolis, Minn., a corporation of Minnesota
Filed Oct. 29, 1962, Ser. No. 233,579
4 Claims. (Cl. 351—30)

This invention relates to the field of visual acuity projectors but more particularly to visual acuity projectors which may be remotely controlled.

For some time now, the field of eyeglass fitting and testing of visual acuity of the eyes has been aided by the use of projectors incorporating certain film charts or slides having the various selected characters, lines, colors, etc. contained thereon and used to replace the wall charts. The use of these projectors has been a decided improvement in this field but the projectors so far exhibit certain disadvantages. The present projectors, when used on a floor stand must be positioned in close proximity to the operator of the projector who is usually the doctor or specialist examining the patient's eyes and who is generally fitting the patient with a pair of eyeglasses. This means, that the projector must be within the reach of the specialist and that the instruments being used for correctly fitting the lenses must also be within easy reach of the operator or specialist and, therefore, the specialist is confronted with a work area which is cluttered with numerous instruments. Also, for certain types of floor models, readjustment must be made to the projectors if they are moved for any reason. Such an arrangement, contributes to the fatigue of the specialist and reduces the amount of time available for consulting new patients. Certain mechanical controls have been devised for remote operation of the projectors but as yet have not proven to be commercially acceptable since the controls are usually effected through the use of relatively stiff cables which do not flex easily and if the cables are allowed to reach a certain length, which in some cases is about five feet, mere flexing of the cable causes movement of the control wire thereby producing an unwanted movement of the controls.

The present invention, contemplates using the projector with electro-mechanical controls so that the projector may be mounted in a permanent location which is out of the way of the patient and doctor or specialist who is fitting the eyeglasses or making an examination of the eyes. By the use of this invention, the doctor may move around to different positions not heretofore possible and yet be in a position to adjust the projector from an area best suited for the functions that he is performing. By the use of the invention, the doctor or specialist is able to devote his time to a larger number of patients and at the same time cut down the fatigue generally associated with the more awkward arrangement of the equipment as is presently being practiced.

The invention contemplates using a projector with remote controls where the driving means, producing rotary power, is translated into linear power for moving the various elements within the projector which are ordinarily adjusted by the operator.

It is therefore a general object of the present invention to provide new and improved visual acuity projection apparatus.

It is another object of this invention to provide projector means having limits stops which are controlled automatically.

It is still a further object of the present invention to provide driving means for moving projector masks which has an infinite number of operable positions.

It is still another object of this invention to provide remote control means for operating all control elements of the projector.

It is yet another object of the present invention to provide means for translating rotational power to linear power for driving the projector masks and film.

These and other objects and advantages of my invention will more fully appear from the following description, made in connection with the accompanying drawings, wherein like reference characters refer to the same or similar parts throughout the several views, and in which:

FIG. 1 is a side view of the pojector showing the driving apparatus attached thereto;

FIG. 2 is a front view of the driving apparatus with the front edge of the bracket for mounting the driving elements shown broken away;

FIG. 3 shows a typical projector in diagrammatic form showing the relative placement of the moving parts thereof; and FIG. 4 is an electrical schematic of the driving apparatus and remote control box.

FIG. 3 shows a projector 10 which has a barrel containing several lenses to properly focus the images being projected upon some screen (not shown). Situated within the body of the projector betwen the forward lenses just described and the reflector, bulb, and condensing lenses, is a horizontally movable mask 11 which contains a plurality of vertically extending slots 12. The horizontally movable mask has its openings 12 in such a position that they move across the projected light beam. Situated immediately in front of mask 11 is a film chart 13 upon which numerous images such as image 14 are formed and it will be seen that film chart 13 is linearly movable in a vertical direction. Situated immediately in front of film chart 13 is a vertically movable mask 15 in which a plurality of horizontally extending slots 16 are formed. It should then be apparent that when any of the slots 12 in mask 11, are in coincidence with slots 16 of mask 15, that the light beam of the projector will pass through film chart 13 and be displayed upon the projector screen. Mask 15 is movable vertically and contains different size slots while mask 11 moves horizontally and contains different size slots 12. Situated near the upper end of mask 15 is an arm 17 through which a small hole 18 has been bored. It will also be evident that film chart 13 may be moved vertically by rotation of a shaft 19 which is connected to a sprocket wheel 20.

Fastened to the outside of housing 10 is a bracket 21 which has a pair of side plates 22 and 23 which are vertically mounted in opposed and spaced relation to each other where their upper ends are connected to each other through a plate 24 and their lower ends are connected to each other through a plate 25. In other words, bracket 21 is formed much like the four sides of a box having no top and bottom. Extending outwardly and upwardly from upper plate 24 is a lug 26 which is fastened to housing 10 by a suitable means such as screws. In like manner, a lug 27 extends outwardly and downwardly from bottom plate 25 and is fastened with suitable fastening means to housing 10. Therefore, the box-like structure is detachably mounted to housing 10. Fastened to the end of shaft 19, is a bevel gear 28 which is fastened to shaft 19 through suitable means such as set screws or pins 29. In mating cooperation with bevel gear 28, is another bevel gear 30 which is also suitably connected to a flexible shaft 19a which is a part of a flexible cable 19c having an outer housing which is connected to plate 22 by extending through a hole therein and being held in place by a lock nut or other suitable fastening means 31. A hole 32 is formed in side plate 23 to form a bearing for the extension of shaft 19a and thereby maintain gears 28 and 30 in working alignment. Situated above gears 28 and 30, is a drum 32 about which is wound a flexible cable 33. Drum 32 is supported for rotation by a shaft 34 which has a flexible portion extending through a flexible cable 34c where the outer housing is connected to side plate 22 by extending through an aperture therein and being held in place by a lock nut 31. The other end of shaft 34 extends through an aperture in side plate 23 to form a bearing 35 and thus provide support for drum 32. One end of flexible cable 33 is connected to a spring 36 which keeps the cable 33 under tension as the other end of spring 36 is connected to the outer end of horizontal mask 11. The other end of cable 33 is connected to the opposite end of horizontal mask 11 (shown in dotted outline in FIG. 2). It will be noted that drum 32 is mounted directly below horizontal mask 11 in order to provide the most direct control over slide 11 while translating the rotary motion into linear motion. Situated above horizontal mask 11 is a second drum 37 which is rotatably supported by a shaft 38 that extends through an aperture in side plate 23 to form a bearing 39 and extends flexibly through a cable 38c, the housing of which is held in position at an opening in side plate 22 by a lock nut or other suitable means 31. Wound about drum 37 is a flexible cable 40 which is connected at its upper end to the upper end of a linear motion member 41 and has its other end connected to a spring 42. The other end of spring 42 is connected to the lower end of linear motion member 41. Linear motion member 41 may be in the form of a tubular member or any such follower construction where it is adapted to slide about a pin or rod 43 which is vertically supported between plates 24 and 25. A hole is formed in top plate 24 (not shown) through which a connecting arm 44 is extended, the lower end of the connecting arm being fastened to linear motion member 41 and the upper end of connecting arm 44 passing through hole 18 in arm 17.

Projector 10 has a base 10b upon which is mounted the electrical driving means 45 by any suitable means such as screws. The structure within driving means 45 will be described more fully in reference to FIG. 4. Flexible cables 19c, 34c, and 38c extend downwardly and are connected through the outer housing of driving means 45.

Electrical driving means 45 contains a power unit which receives alternating line current through a pair of conductors 46 and 47. Conductor 47 extends to a control unit 48 where it is connected to one terminal of a single-pole-single-throw switch 49. The other terminal of switch 49 is connected to a conductor 50 which provides an alternating current to the primary winding of a transformer 51. The other terminal of the primary winding is connected to conductor 46. The secondary winding of transformer 51 is connected to a copper oxide rectifier bridge network 52 in normal manner and the pulsating direct current taken from the copper oxide rectifier bridge 52 is applied to a capacitor 53. A direct current is then taken from one side of capacitor 53 and applied to a conductor 54 and a conductor 55 is connected to the other side of capacitor 53. Conductor 54 is connected to one terminal of a lamp 56 indicating that power is applied thereto and is also connected to one of the central terminals of three double-pole-double-throw switches 57, 58 and 59. Conductor 55 is connected to the other terminal of lamp 56 and the other central terminals of double-pole-double-throw switches 57, 58 and 59. It should be kept in mind that lamp 56 indicating that the direct current is applied to the system, as well as switches 49, 57, 58, and 59 are all located in the control box 48. A motor 60 which is preferably of the D.C. reversible type, has a common connection through a conductor 61 with opposite terminals on opposite sides of switch 59 so that the polarity of the voltage may be reversed to the motor to provide a versatile operation for the motor. A parallel circuit is formed as the return conductor for motor 60 where a conductor 62 connected to motor 60 is connected to one of the terminals of each of a pair of single-pole-single-throw switches 63 and 64 through a pair of conductors 62a and 62b respectively. The other terminal of switch 63 is connected to one of the outside terminals of reversing switch 59 through a conductor 65 and the other terminal of switch 64 is connected to a terminal on the opposite side of switch 59 through a conductor 66. Motor 60 is connected to a gear train 67 shown in block diagram form through a shaft 68 where a suitable gear ratio is selected. A mechanical control such as a lug or detent on a gear 69 is used to actuate switch 63 into an open position upon motor 60 rotating a predetermined amount in a first direction and a similar mechanical connection is made through a lug or detent 70 connected with gear train 67 to open switch 64 when motor 60 rotates in the opposite direction to some predetermined limit. The output from gear train 67 is provided by shaft 19a. Another motor 71 is connected to a gear train 72 through a connecting shaft 73, the output of the gear train being provided through shaft 38. Motor 71 may be of the same type as that just described and has a pair of conductors 74 and 75 which are connected to each of the terminals on one side of switch 58 and to the opposite terminals on the other side of switch 58 in common reversing switch fashion. Another motor 76 similar to motors 71 and 60, is connected to a gear train 77 through a shaft 78 where the output of gear train 77 is provided through shaft 34. Motor 76 has a pair of conductors 79 and 80 connected thereto at one end and connected to the terminals on one side of switch 57 and to the opposite terminals on the other side of switch 57 in normal reversing switch fashion. All of the conductors extending between control box 48 and the driving means 45 may be encased in a single cable 81.

In operation, vertical mask 15 may be moved upwardly or downwardly by the rotation of drum 37 which is controlled by reversing switch 58. Upon the mask reaching its upper or lower limit, the drum is allowed to slip within the flexible cable 40 without damage to the motor or gear train. In like manner, horizontal mask 11 may be adjusted to the left or right by manipulation of switch 57 so that the slots therein may be changed as desired. The film chart 13 may be moved upwardly until the film chart reaches its upper limit whereupon mechanical lug 69 opens switch 63 to prevent motor 60 from driving any further in a direction producing linear upward motion of film chart 13. In a like maner, as film chart 13 is driven downwardly, and reaches its lower limit, the mechanical element 70 opens switch 64 thereby breaking the electrical circuit to motor 60 and stopping the downward motion of film chart 13.

It should be kept in mind that during the operation of the projector, that the control box 48 may be moved to any desirable position and that the cable 81 may be of sufficient length to allow the doctor or operator to be in the most advantageous position for the particular function being performed at the time. In fact, where the so-called mechanical remote controls may operate up to about five feet from the projector with certain difficulties, the present invention allows the control box to be located 5, 10, 15 or 20 feet or more, from the projector without any adverse effect whatsoever occasioned by the distance separating the control box and the projector driving means. That is, the projector may be located any place the doctor or operator so desires and such location will only be governed by the capabilities of the projector per se. It will be seen that an efficient and inexpensive means has been devised for controlling the operation of the projector by changing rotary motion to linear motion and that an inexpensive and efficient means has been provided for limiting the travel of the two different masks used with the projector. The springs which are connected to the cords wound around drums 32 and 37 provide constant tension on the cords yet allow sufficient resiliency to slip when the masks have reached their limits of travel.

It will, of course, be understood that various changes may be made in the form, details, arrangement and proportions of the parts without departing from the scope of my invention which consists of the matter shown and described herein and set forth in the appended claims.

What is claimed is:

1. Visual acuity projection apparatus comprising:
   (a) a projector including a horizontally movable vertically slotted mask, a vertically movable horizontally slotted mask and a film chart having a plurality of visual acuity test characters linearly movable parallel to one of said masks, said masks and film chart constructed and arranged to be controllably moved across the light beam from said projector and co-operating to expose said test characters for projection between predetermined limits of travel;
   (b) an electrical driving means including at least one reversible motor adapted to be controlled electrically;
   (c) translational power means including a first spring attached to one end of said horizontal mask, a pair of rotatably supported drums driven by said electrical driving means, one of said drums having a flexible cable wound therearound, one end of which is attached to one end of said horizontally movable mask and the other end of which is connected to the other end of said spring, a second spring, a linear motion member supported for movement parallel to said vertically movable mask and in spaced and perpendicular relation to said other drum, another flexible cable wound about said other drum, one end of which is attached to one end of said linear motion member and the other end of which is connected to the other end of said member through said second spring, a connecting arm extending between said linear motion member and said vertically movable mask for causing movement thereof, and means drivably connecting said electrical driving means with said film chart and translating the motor movement of said electrical driving means into linear movement;
   (d) and switch means electrically connected to said electrical driving means for controlling the movement of said masks and film chart to one of an infinite number of positions between said predetermined limits of said masks and film chart.

2. The invention as set forth in claim 1 wherein said electrical driving means includes electrical limit stops connected thereto and actuated thereby independently of said film chart but at said point of movement of said driving means representative of said film chart displacement limit.

3. The invention as set forth in claim 1 wherein said driving means includes three electrical motors connected to said masks and film chart through translational power means, said translational power means converting said motor power into linear power.

4. The invention as set forth in claim 3 wherein said translational power means is constructed and arranged to allow said motors to rotate, but arresting the linear power when said masks have been driven to their predetermined displacement limits.

References Cited by the Examiner

UNITED STATES PATENTS

| | | | |
|---|---|---|---|
| 1,402,829 | 1/1922 | Bell | 351—36 X |
| 1,879,501 | 9/1932 | Rigler | 40—53 |
| 2,299,973 | 10/1942 | Getten | 88—28 |
| 2,366,554 | 1/1945 | Peck et al. | 351—30 X |
| 2,781,042 | 2/1957 | Bartow | 351—30 X |
| 2,986,968 | 6/1961 | Kropp et al. | 351—30 X |
| 3,134,178 | 5/1964 | Fox et al. | 351—13 X |
| 3,146,663 | 9/1964 | Kirkconnell et al. | 88—26 X |

DAVID H. RUBIN, *Primary Examiner.*